United States Patent [19]

Iwashita et al.

[11] 3,994,003

[45] Nov. 23, 1976

[54] MOTOR-DRIVEN OPERATING APPARATUS FOR A PHOTOGRAPHIC CAMERA

[75] Inventors: Tomonori Iwashita, Chofu; Hiroshi Aizawa, Machida; Susumu Kozuki, Yokohama; Masanori Uchidoi, Kawasaki, all of Japan

[73] Assignee: Canon Kabushiki Kaisha, Tokyo, Japan

[22] Filed: July 8, 1974

[21] Appl. No.: 486,368

[30] Foreign Application Priority Data
July 10, 1973   Japan.......................... 48-81601[U]
Apr. 4, 1974   Japan.......................... 49-38164[U]

[52] U.S. Cl................................... 354/173; 354/214; 354/217
[51] Int. Cl.².......................................... G03B 1/18
[58] Field of Search................... 354/214, 173, 217; 352/124; 242/71.6

[56] References Cited
UNITED STATES PATENTS

| | | | |
|---|---|---|---|
| 1,779,424 | 10/1930 | Fairchild | 354/214 |
| 2,880,661 | 4/1959 | Kaden | 354/214 |
| 3,598,033 | 8/1971 | Sasaki | 354/214 |
| 3,757,660 | 9/1973 | Kuramoto | 354/204 |
| 3,783,762 | 1/1974 | Sugimori | 354/173 |

*Primary Examiner*—John Gonzales
*Attorney, Agent, or Firm*—Toren, McGeady and Stanger

[57] ABSTRACT

An operating apparatus provided with a rotary actuator which is driven by a motor to operate two actuating means for the shutter and film-winding mechanisms of an associated camera in timed relation. The motor is associated with a control circuit including a delay circuit responsive to the voltage of a power supply source connected to the motor, by which the initiation of the braking of the motor is controlled with respect to the termination of duration of the film winding operation so that when the motor is stopped from rotating, the rotary actuator assumes with high accuracy a predetermined operating position ready to operate the actuating means for the shutter mechanism regardless of variation of the voltage of the power supply source.

5 Claims, 12 Drawing Figures

MOTOR-DRIVEN OPERATING APPARATUS FOR A PHOTOGRAPHIC CAMERA

BACKGROUND OF THE INVENTION

1. Field of the Invention

This invention relates to motor-driven operating apparatus for photographic cameras, and more particularly to an apparatus for operating the shutter mechanism and the film winding mechanism of a camera in timed relation and capable of repeating the sequence of operations.

2. Description of the Prior Art:

In camera operating processes, the requirements for the instantaneous initiation of an exposure operation after the depression of a shutter release button are rigorous. Recently, various improvements have been made in the structures of cameras so that, after the depression of the shutter release button, the diaphragm mechanism and mirror mechanism and the like are first operated and then the shutter mechanism is actuated for exposure of the associated photographic film. Such improvements, therefore, result in an increase in the time interval between the depression of the shutter release button and the actuation of the shutter mechanism. Particularly in the case of a camera equipped with a motor-driven operating apparatus, the aforesaid time interval is elongated by an additional time interval necessary for transmitting the movement of the operable button of the apparatus to the shutter release button of the camera. For example, a prior art motor-driven operating apparatus is provided with a rotary actuator which controls one cycle of the shutter releasing operation followed by the film winding operation of the camera as it rotates in one revolution. In order to be sure that the rotary actuator in the apparatus ready to make an exposure assumes the most appropriate operating position for rapid actuation of the shutter release button, there is usually provided detent means which is arranged to move away from the rotary actuator when the operable button of the apparatus is actuated, thereby the rotary actuator is permitted to rotate for operating the actuating means for the shutter mechanism. In this case, a considerable time interval is required for effecting the displacement of the detent means, being added to the aforesaid delay time interval. In addition to such a drawback, the motor-driven operating apparatus of the construction described above has another drawback that the time interval necessary for the detent means displacement is increased, as the voltage of the power supply source connected to the motor is decreased with decrease in the force by which the detent means is moved away from the rotary actuator.

SUMMARY OF THE INVENTION

Accordingly, the general object of the invention is to eliminate the above-mentioned drawbacks.

An object of the present invention is to provide a motor-driven operating apparatus for a photographic camera permitting the initiation of an exposure operation in a heretofore attainable short time interval after the actuation of the shutter release button.

Another object of the invention is to provide a motor-driven operating apparatus for a photographic camera provided with a multi-purpose rotary actuator which operates two actuating means for the shutter mechanism and the film winding mechanism cooperating with the shutter cocking and film advance mechanisms of the camera in timed relation as it is driven by a motor which is electrically controlled so that when the motor is stopped from rotating, the rotary actuator assumes with high accuracy a predetermined operating position ready to operate the actuating means for shutter mechanism.

Still another object of the present invention is to provide a motor-driven operating apparatus for a photographic camera in which the rotary actuator is associated with a control circuit responsive to variation of the voltage of a power supply source connected to the motor, so that the rotary actuator can be automatically set to a predetermined operating position ready to operate the actuating means for the shutter mechanism regardless of the variation of the power supply source voltage.

A further object of the present invention is to provide a motor-driven operating apparatus for a photographic camera provided with a single operable member which permits for the operator to readily operate the film rewinding mechanism.

DESCRIPTION OF THE PREFERRED EMBODIMENT

One embodiment of the invention comprises drive means including an electric motor, a rotary drive gear assembly connected to the motor through a gear train, a rotary actuator associated with the drive gear assembly, a first rotary drive adapter assembly adapted for engagement with the film winding mechanism of a camera, a film rewinding mechanism operatively associated with a second drive adapter assembly adapted for engagement with a supply spool of film provided in the camera, and a motor drive control circuit each of which will be now described with reference to the drawings.

Figure 1:
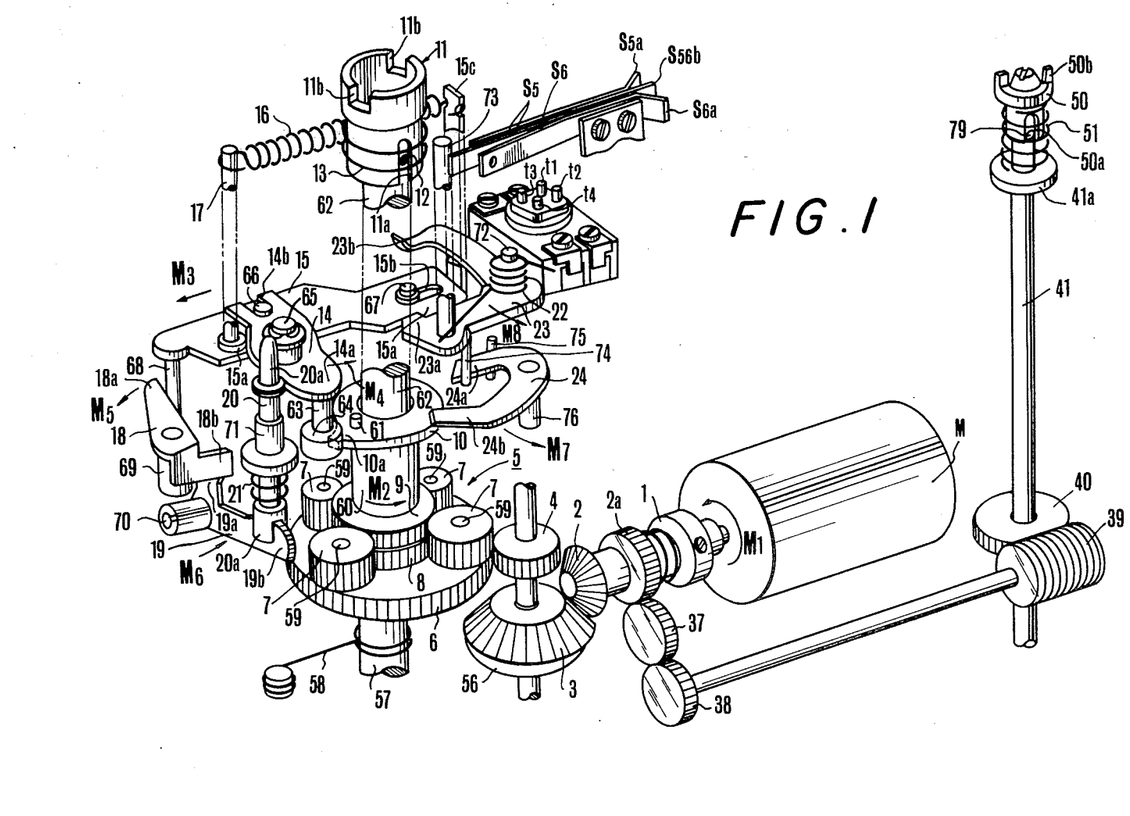
FIG. 1 is a fragmentary perspective view of one embodiment of a motor-driven operating apparatus for a photographic camera according to the present invention.
Figures 3, 4, 5A:
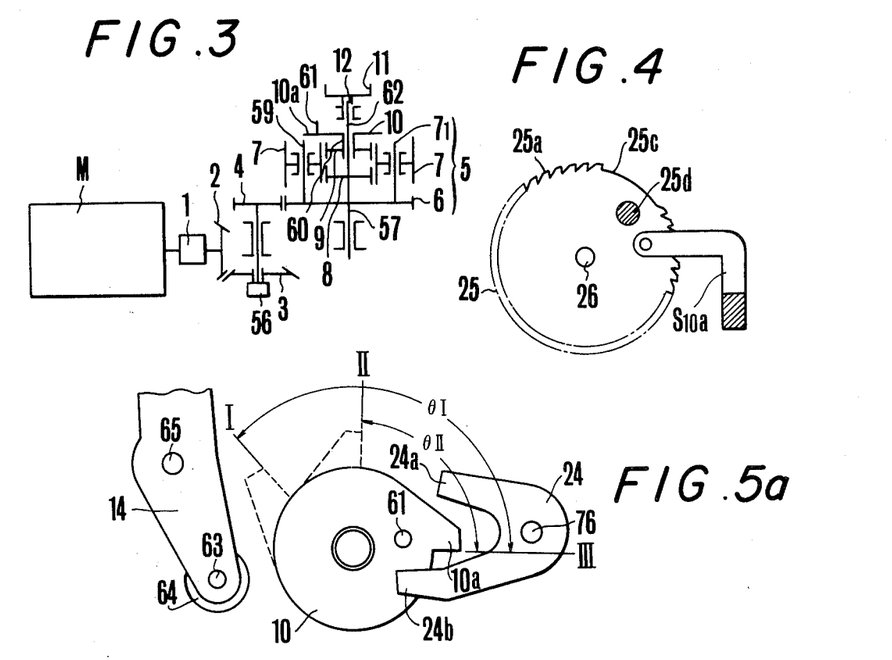
FIG. 3 is a vertical sectional view schematically illustrating the linking relationship between the motor and the winding shaft in the apparatus of FIC. 1.
FIG. 4 is a fragmentary rear elevational view illustrating the construction of a switch arranged in the counter mechanism of FIG. 2.
FIG. 5a is a fragmentary top view of the rotary actuator of FIG. 1 in an operating position ready for shutter releasing operation.

Referring now to FIG. 1 the rotary drive gear assembly that is generally indicated at 5 comprises a gear 6 which is rigidly fixed to a shaft 57 which is prevented by a reverse rotation preventing spring 58 from achieving a clockwise rotation as viewed in FIG. 1 and which is driven by a motor M through a gear train comprising a spur gear 4 engaging the gear 6, a first bevel gear 3 coaxially connected to the spur gear 4 through a one-direction clutch 56 so that the motion of the motor M is transmitted to the spur gear 4 only when the motor M is rotated in a counter-clockwise direction indicated by arrow $M_1$, a second bevel gear 2 engaging the first bevel gear 3 and rigidly fixed to a shaft which is connected through a slip clutch 1 to the drive shaft of the motor M. The gear 6 carries four planet gears 7 which are rotatable about their respective shafts 59 fixedly mounted on the gear 6 and spaced apart at an angular distance of 90° from each other. First and second sun gears 8 and 9 are arranged in a coaxial relationship to each other as well as to the gear 6 to engage all of the planet gear 7. The second sun gear 9 is fixedly mounted on one end of a hollow shaft 60 which at the other end fixedly carries a rotary actuator in the form of a cam plate 10 having a cam lobe 10a and a pin 61 extending upwardly from the surface thereof. The first sun gear 8 is fixedly mounted on the lower end of a rotatable shaft 62 which extends through the hollow shaft 60 and terminates in an adapter piece 11 having a longitudinally elongated slot 11a in which a pin 12 vertically fastened to the shaft 62 is engaged to permit the axial movement of the adapter piece 11. The adapter piece is designed to joint the shaft 62 with an operating shaft of the film winding mechanism of a camera when the recesses 11b provided in the adapter piece 11 is brought into engagement with the projections of the operating shaft. The part 11 and 62 constitute part of the first rotary drive adapter assembly according to the invention. The connecting relationships of these parts are schematically illustrated in FIG. 3. An expansion spring 13 is compressed between the adapter piece 11 and the housing of the apparatus.

The construction and operation of the sun-and-planet gear mechanism is as follows: The first and second sun gears 8 and 9 are selected to differ from each other in the number of teeth by the number of planet gears, or a multiple thereof. In this embodiment, the first sun gear 8 is selected to have a number of gear teeth larger by four teeth than that of the second sun gear 9, so that all of the four planet gears are permitted to fully mesh with both of the sun gears 8 and 9. Assuming now that the sun gears 8 and 9 are free for rotation in such an arrangement of the gears, as one of the sun gears 8 and 9 is driven into rotation, the other sun gear is rotated at a speed such that a difference between the speeds of the gears 8 and 9 depends upon the difference between the numbers of gear teeth of the gears 8 and 9. Further assuming that the gear 6 is driven into rotation in the direction of arrow $M_2$, the first sun gear is rotated in the same direction so long as the second sun gear is prevented from rotation and the second sun gear 9 is rotated in the opposite direction so long as the first sun gear 8 is prevented from rotation. In the rotary drive gear assembly of the construction described above, the speed reduction ratio in transmitting the motion of the gear 6 to the first sun gear 8 provided that the second sun gear 9 is prevented from rotation may be defined by the following formula.

$$\frac{\text{Difference between the numbers of teeth of the first and second sun gears}}{\text{Number of gear teeth of the first sun gear}}$$

The motion of the first sun gear is transmitted through the adapter piece 11 to the operating shaft of the film winding mechanism cooperating with mechanisms such as the film advance mechanism and the shutter cocking mechanism provided in the camera body. As the adapter piece 11 is rotated, the film winding mechanism is operated to advance the film one exposure frame at a time and simultaneously the shutter cocking mechanism is reset to its shutter-charged position. The film winding mechanism is provided with detent means not shown arranged so that upon termination of the film advancing operation, the operating shaft of the film winding mechanism is prevented from achieving further rotation and, therefore, the first sun gear 8 is stopped from rotating, thereupon causing the second sun gear 9 to rotate in the opposite direction that of the rotation of the first sun gear 8 until the cam lobe 10a of the cam plate 10 abuts a roller 64 which is rotatably mounted at a shaft 63 on one arm of a two-armed lever 14 which at the end of the other arm has a slot 14b in which is engaged a pin 66 mounted on a slide 15. The lever 14 is fulcrumed at a pivot pin 65 rigidly fixed on the apparatus housing and is biased to urge the roller 64 into abuttment with the camming surface of the cam plate 10 so long as the slide 15 is released from the locked position illustrated in FIG. 1.

The actuating means for the shutter release mechanism of the camera comprises the slide 15 having two longitudinally elongated slots 15a and 15b in which are slidably engaged respective pins 17 and 67 fixedly mounted on the apparatus housing, and which is biased in a direction indicated by arrow $M_3$ by a helical spring 16 connected between the pin 17 and a rectangularly bent portion 15c of the slide 15. The slide 15 is further provided with a recessed portion 15d for engagement with a projection 23a of a latch lever 23 which serves as an operating lever for a counter mechanism as will be described later and with an elongated pin 68 planted on the opposite arm to that having the extension 15c. Abuttingly engaged with the pin 68 is one end portion of a first interconnecting lever 18 which is pivotable about a shaft 69 fixedly mounted on the apparatus housing and which at the other end has an L-shape bent portion 18b normally engaging one arm of a second interconnecting lever 19 which is pivotable about the pin 70 fixedly mounted on the apparatus housing and which has the other arm 19b engaging in a recessed portion 20a of a release rod 20. The release rod 20 is vertically disposed and is movably mounted in a flanged bushing 71 fixedly mounted in the apparatus housing, and is biased by an expansion helical spring 21 to urge the release rod 20 to move away from the shutter release button of the shutter mechanism of the camera. The latch lever 23 is pivoted at a shaft 72 fixedly mounted on the apparatus housing and is biased by a tension spring 22 in a clockwise direction. A bevelled edge 23b is provided on the other arm of the latch lever 23 to abut with an extension 29a of a control plate 29 of a ratchet mechanism (see FIG. 2). Fixedly mounted on the upper and lower surfaces of the lever 23 are respectively an elongated pin 73 for operating an automatic selector switch assembly S5 and S6 and another elongated pin 74 for engagement with one arm of a V-shape lever 24 which is pivoted at a shaft 76 fixedly mounted in the apparatus housing. When the lever 24 is turned in a direction indicated by arrow $M_7$ from the position indicated in FIG. 1, the latch lever 23 is turned in the direction of arrow $M_8$ to release the slide 15 from the locked position. The other arm of the lever 24 extends over the surface of the cam plate 10 into the range of travel of the pin 61. For limiting the pivoting movement of the V-shape lever 24 in the clockwise direction, there is provided a pin 75 fixedly mounted on the apparatus housing. Positioned adjacent the pin 73 is the switch assembly S5 and S6 so that when the projection 23a of the lever 23 is received in the recessed portion 15d of the slide 15, a common movable contact S56b is brought into contact with a fixed contact S5a of the switch element S5 under the action of the elasticity of the movable contact S56b itself, thereby the switch element S5 is turned on, while the other switch element S6 remains in its opened position. When the latch lever 23 is turned in the direction indicated by arrow $M_8$ against the force of the spring 22, the common movable contact S56b is taken out of contact with the fixed contact S6 against the elastic force, thereupon the switch S5 is turned off. The fixed contact S6a of the other switch element S6 is arranged so that when the angular displacement of the lever 23 in the direction of arrow $M_8$ has reached the maximum, or when the angular displacement of the lever 24 in the direction of arrow $M_7$ has reached the maximum, the common movable contact S56b is brought into contact with the fixed contact S6a by means of a pin 73, thereby the switch element S6 is turned on. However, when the pin 61 is moved away from the arm 24b as the rotary actuator rotates, the lever 24 is returned by the action of the spring 22 in the opposite direction to that of arrow $M_8$ to permit the movable contact S56b to be taken out of contact with the fixed contact S6a. Thus, it is to be noted that the switch element S6 is arranged to be subject to the momentary closure when the pin 61 strikes the arm 24b of the lever 24.

Figure 2:
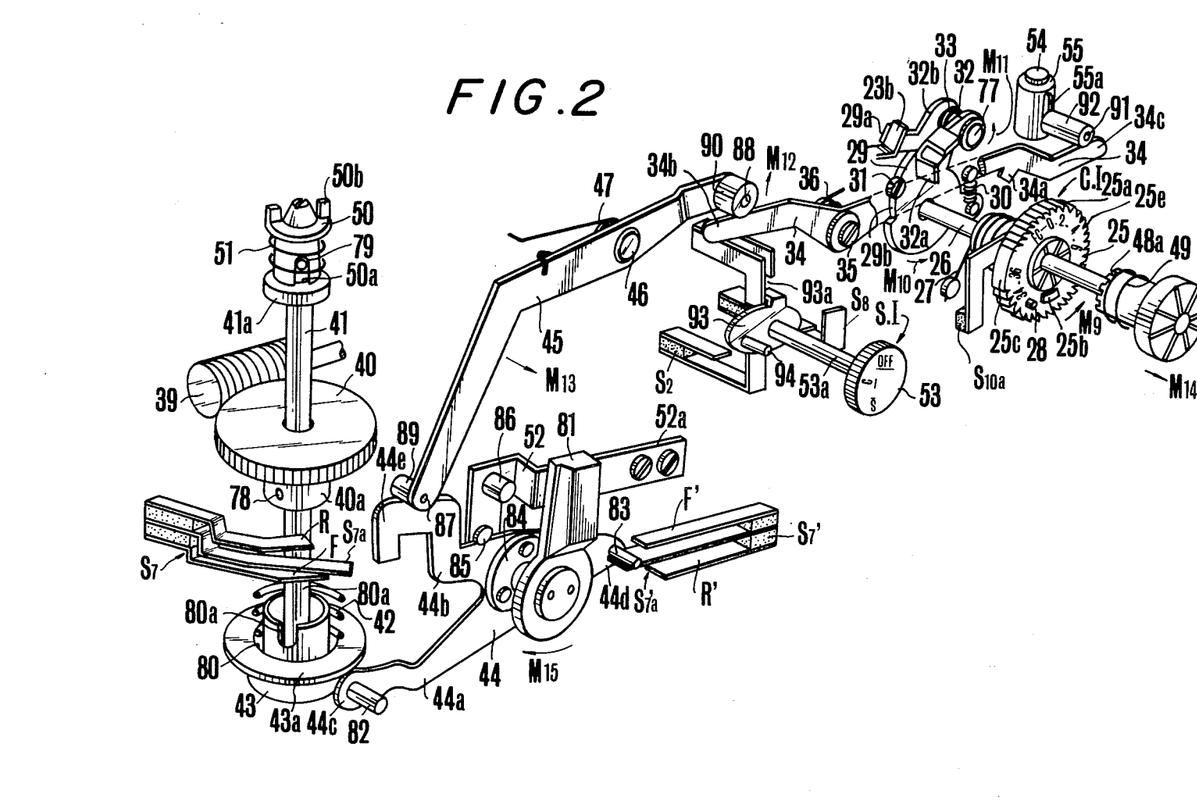
FIG. 2 is a fragmentary perspective view illustrating a rewinding and counter mechanisms of the motordriven operating apparatus according to the embodiment of FIG. 1.

The film counter mechanism is illustrated in FIG. 2 as comprising a ratchet wheel 25 which carries a film frame scale dial and is rotatable about a shaft 26 fixedly mounted on the housing of the apparatus. The ratchet wheel 25 is biased by a helical portion spring 27 for rotation about the shaft 26 in a counter-clockwise direction indicated by arrow $M_9$, so that when the ratchet wheel 25 is disengaged from the pawl 32a of the ratchet 32 and the pawl 34a of a detent lever 34, the ratchet wheel 25 is set under the action of the spring 27 to its rest position where the projection 25b extending from the ratchet wheel is abuttingly engaged with a pin 28 fixedly mounted on the housing of the apparatus, and a graduation indicated by the numerical character "36" on the dial is aligned with a stationary index CI. The ratchet mechanism comprising the parts 25, 32 and 34 is provided with a control plate 29 which is rotatable about the shaft 26 and which is biased by a helical spring 30 in a counter-clockwise direction indicated by arrow $M_{10}$. The control plate 29 has a rectangularly bent portion 29a which abuttingly engages the bevelled portion 23b of the latch lever 23, so that when the lever 23 is caused to turn about the shaft 62 in the direction of arrow $M_8$ against the force of the spring 22, the plate 29 is turned in the clockwise direction. For limiting the pivoting movement of the plate 29 relative to the ratchet wheel 25 it is provided with a circular cutout 29a arranged concentrically to the axis of the shaft 26 in which cutout a pin 21 rigidly fixed on the apparatus housing is positioned. A ratchet 32 conveying the motion of the plate 29 to the wheel 25 is pivotally mounted on the plate 29 at a pin 77 rigidly fixed thereon and is biased by a spring 33 in a counter-clockwise direction indicated by arrow $M_{11}$. Cooperating with the ratchet 32, a pawl 23a is arranged on the lower edge of the lever 34 which is fulcrumed at pivot pin 35 rigidly fixed to the housing and which is biased by a spring 36 in the clockwise direction indicated by arrow $M_{12}$.

As the plate 29 is turned about the shaft 26 in the clockwise direction to a position where the lower edge of the cutout 29 abuts the pin 31, the pivoting movement of the plate 29 is transmitted through the ratchet 32 to the ratchet wheel 25, thereby the frame scale is advanced one graduation corresponding to one exposure frame in the clockwise direction and thereupon the ratchet wheel 25 is arrested by the pawl 34a of the lever 34. Next, the plate is returned by the action of the spring 30 to its initial position, but the ratchet wheel 25 remains set in the one-tooth advanced position. The sequence repeats itself until the graduation indicated by numerical character "O" on the dial 25 is aligned with the index CI, or until all of the available exposure frames have been exposed. The ratchet 32 is provided with a lug 32b extending into the range of travel of the lever 34 so that when the lever 34 is turned about the pin 36 in the counter-clockwise direction against the force of the spring 36, the pawl 34a is disengaged from the ratchet wheel 25e and simultaneously, the ratchet 32 is turned about the pin 6 in the clockwise direction, causing the ratchet 32 to be disengaged from the ratchet wheel 25, thereby the ratchet wheel 25 is turned about the shaft 26 in the counter-clockwise direction until the graduation indicated by numerical character "36" on the dial is placed in registry with the index CI. The ratchet wheel 25 or its dial can be manually rotated to place a desired frame graduation in registry with the index CI by operating a rotatable knob 48 which is rotatably mounted on the shaft 26 and which is biased by an expansion spring 49 which tends to move the knob 48 in parallel to the axis of the shaft 26 away from the ratchet wheel 25. The fluted end portion 48a of the sleeve affixed to the knob 48 is engageable with the fluted portion 25e of the ratchet wheel 25. Pushing the knob 48 to join the sleeve 48 with the ratchet wheel 25 at their fluted portions 48b and 25e, the operator may turn the knob 48 to place the frame graduation corresponding to the number of exposure frames available in the associated film in registry with the index CI. When a film magazine is used in the camera, the operator has to place the character "FC" on the dial 25 in registry with the index CI. In this case, the ratchet pawl 32a is positioned on a non-toothed portion 25c provided on the periphery of the ratchet wheel 25, so that the motion of the reciprocating plate 29 is not transmitted to the ratchet wheel 25 during the entire operation of the film magazine. Positioned adjacent the ratchet wheel 25 is a slide which serves as a movable contact S10a of a switch S10 and of which the end portion is permitted to abut the back surface of the ratchet wheel 25 made of conductive material. As shown in FIG. 4, an insulated section 25d is provided on the back surface of the ratchet wheel 25a and is arranged therein so that when the graduation "0" is registered with the index CI, the end portion of the contact S10a is positioned on the insulated section 25d, thereby the switch means S10 is turned off.

The film rewinding mechanism comprises a gear 2a coaxially connected to the drive shaft of the motor M through the slip clutch 1 and constituting a gear train together with gears 37 and 38, a worm gear 39 rigidly fixed on the shaft of the gear 38 meshing with the worm wheel 40 which is rotatable about the rewinding shaft 41. As shown in FIG. 2, the worm wheel 40 has a sleeve 40a affixed thereto and having a pin 78 rigidly fixed thereon to engage in a recess 80a of another sleever 80 rigidly fixed at the end of the shaft 41 when a flanged sleeve 43 which is rotatably mounted on the lower end of the shaft 41 is moved upward for rewinding operation in engagement of the flange 43a with the end 44c of one arm 44a of a Y-shape lever 44 affixed to a rotatable shaft 84. The upper end of the shaft 41 supports an adapter piece 50 which is designed to join the shaft 41 with the supply spool of film in the camera body. The adapter piece 50 has a pair of extensions 50b for engagement with the recesses of the supply spool in a patrone of the film and a longitudinally elongated slot 50a in which is engaged a pin 79 rigidly fixed on the shaft 41, thereby the adapter piece 50 is movable along the shaft 51 and is biased by an expansion spring 51 provided between the extension 50b and a colar 41a of the shaft 41. The Y-shape lever 44 is provided with a pair of pins 82 and 83 rigidly mounted on the arm ends 44c and 44d respectively to control the operation of a pair of switches S7 and S7' for controlling the direction of rotation of the motor M. The switches S7 and S7' have movable contacts S7a and S7'a which are normally in contact with their respective fixed contacts F and F'. When the Y-shape lever 44 is turned about the axis of the shaft 84 in the clockwise direction of arrow $M_{15}$, the switches S7 and S7' are set from their positions F and F' to their positions R and R'. In order to avoid accidental unintentional actuation of the rewinding knob 81 rigidly mounted on the shaft 84, there is provided an elastic locking plate 52 of which the one end 52a is fastened to the housing and which at the other end portion has pins 85 and 86 rigidly fixed thereon. The pin 85 is arranged to arrest the arm 44b of the lever 44 when the rewinding operation is not carried out, and to permit the pivoting movement of the lever 44 in the clockwise direction as indicated by arrow $M_{15}$ when the pin 86 is pushed against the elastic force of the plate 52 itself to cause the pin 85 to be disengaged from the arm 44b. Positioned between the levers 44 and 34 is a lever 45 which is fulcrumed at a pivot pin 46 rigidly fixed on the apparatus housing and is biased in a counter-clockwise direction indicated by arrow $M_{13}$ by a tension spring 47 which tends one arm of the lever 45 to abuttingly engage the camming surface 44e provide on the arm 44b of the lever 44 at a roller 89 which is rotatable about a pin 87 fixedly mounted on the end portion thereof. The other arm of the lever 45 has a pin 88 rigidly fixed thereon on which a roller 90 is rotatably mounted for engagement with one arm of the lever 34 which is biased by the spring 36 to urge it into abutting engagement with roller 90. Positioned adjacent the other lever end 34c is a roller 92 which is rotatable about a pin 91 vertically extending from a pin 54 through an elongated slot 55a provided through a cylinder 55 in which the pin 54 is slidably mounted. The parts 54, 55, 91 and 92 constitute a mechanism which actuates and releases the sprocket operating button not shown in the camera body to its operative state and to its inoperative state, respectively, in response to a downward and an upward movement of the lever end 34c engaging the roller 92.

For selecting exposure operation modes, i.e., a series of continuous successive frame exposure operations and a single frame exposure operation, there is provided a selector dial 53 having symbols "OFF", "C" for a series of continuous successive frame exposure operations, and "S" for a single frame exposure operation. The selector dial 53 is mounted on a shaft 53a which is rotatably mounted in the apparatus housing. The shaft 53a is provided with a flange 93 having an extension 93a adapted to operate a main switch SM of the camera and a pin 94 planted thereon and adapted to operate both a main switch S2 of the apparatus and a switch S8 for selecting an exposure operation modes. These three switches SM, S2 and S8 are operated in the following manner in relation to the selected position of the dial 53.

| Symbol on the dial 53 in registry with an index SI | | Switch SM | Switch S2 | Switch S8 |
| --- | --- | --- | --- | --- |
| OFF | (No exposure operation) | off | off | on |
| C | (Continuous exposure operation) | on | on | on |
| S | (Single exposure operation) | on | on | off |

Figure 6:
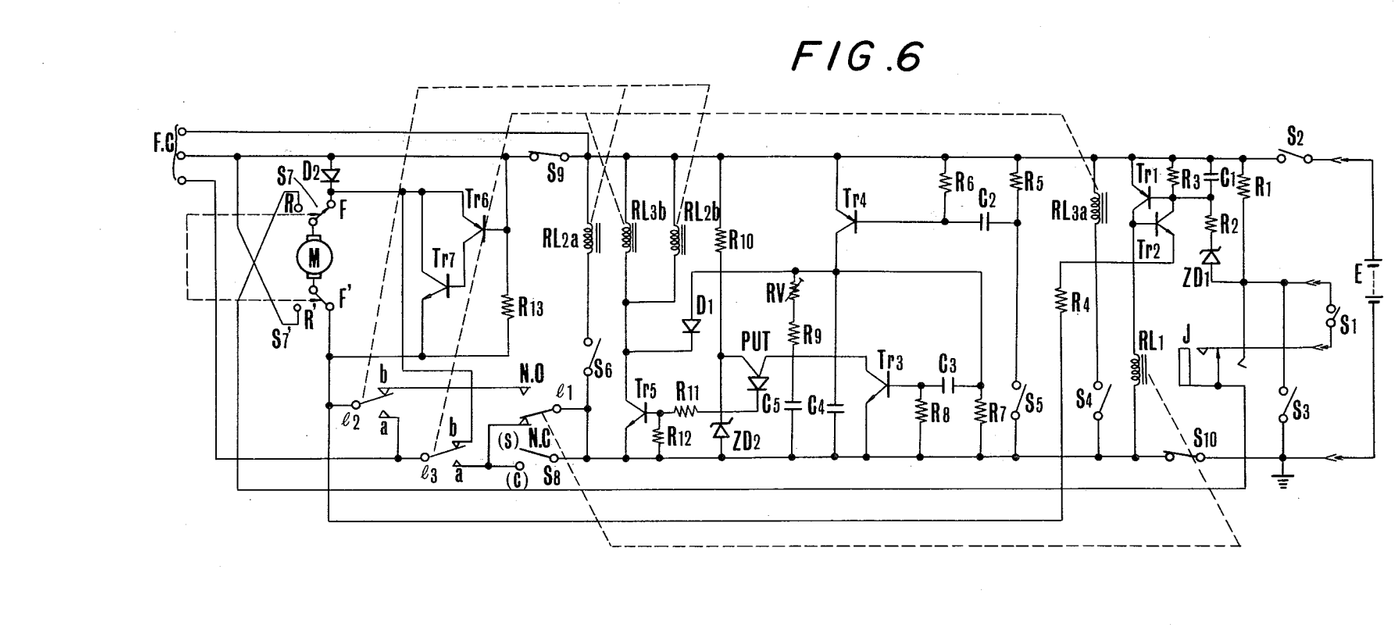
FIG. 6 is a motor drive control circuit diagram of the apparatus of FIGS. 1 and 2.

Referring now to FIG. 6, there is shown an electric circuit adapted for use with the apparatus according to the present invention. The motor M is connected to a power supply source E through the aforementioned switches S2, S9, S7, S7', S8 and S10. S1 is a release switch provided in the apparatus or a release unit thereof. S3 is a release switch adapted for use in mechanical release operation such as cable release which is effected from the outside of the apparatus. S4 is a switch which is operated in response to the operation of the shutter of the camera. S9 is a switch which is operated when a film chamber is attached to the camera. The circuit is constructed as comprising a release holding circuit, a delay circuit, and a motor braking circuit. The release holding circuit comprises transistor Tr1 and Tr2 and resistors R3 and R4. A condenser C1 connected across the resistor R3 is provided for preventing error operation. A resistor R2 and a constant voltage diode ZD1 are provided for setting the sensitivity to the signal applied from the outside to a jack J. When either of the release switches S1 and S3 is closed, a base current of the transistor Tr1 is allowed to flow through the resistor R2 and a constant voltage diode ZD1 to the earth, thereby the transistor Tr1 is rendered conductive to energize the relay RL1. Upon energization of the relay RL1, a first transfer switch L1 which is normally set to the position NC is set to the position NO to connect that terminal of the resistor R4 which is opposite to that connected to the emitter electrode of the transistor Tr2 to the negative terminal of the power source, provided that a second transfer switch L2 is set in its b position, thereby the connection of the transistors Tr1 and Tr2 is permitted to have a self-sustaining function, so that even when the closed release switch S1 or S3 is opened, the conductive state of the transistors Tr1 and Tr2 is sustained to maintain the energized state of the relay RL1. In addition to the relay RL1 arranged upon energization to set the first transfer switch L1 from the "NC" position to its "NO" position, there are provided latching relays RL2a and RL3a arranged upon energization to set respectively the second transfer switch L2 and a third transfer switch L3 from their b positions to their a positions, and latching relays RL2b and RL3b arranged upon energization to set respectively the second and third transfer switches L2 and L3 from their a positions to their b positions. As the relay and latching relays are operated, the motor M is controlled.

The delay circuit responsive to variation of the voltage of the power supply source E comprises fixed resistors R9 and R10, a variable resistor RV, a condenser C5, an oscillator element PUT and a constant voltage diode ZD2. When the switch S5 is closed in response to the operation of the actuating means for the shutter mechanism of the camera, a transistor Tr4 is rendered conductive to charge a condenser C4 of which the charge stored thereon in turn is applied to the condenser C5 through the variable resistor RV and the fixed resistor R9. When the voltage across the condenser C5 has reached the gate voltage of the oscillator element PUT it is rendered operative causing a pulse to appear at the cathode thereof. The pulse is applied through a resistor R11 to the base of a transistor Tr5, thereupon the transistor Tr4 is momentarily rendered conductive to energize latching relays RL2b and RL3b. The level of the gate voltage of the oscillator element PUT is dependent upon the diode ZD2. Therefore, the charging time of the condenser C5 is controlled by the diode ZD2 and is varied with variation of the voltage of the power supply source. As the voltage of the power supply source E is decreased, the time interval between the initiation of closure of the switch S5 and the initiation of conduction of the transistor Tr5 is increased as it is controlled by the delay circuit of the construction described above.

The motor braking circuit comprises transistors Tr6 and Tr7 a resistor R13 and the second and third transfer switches L2 and L3. When the switch S5 is turned on, at the time after a time interval controlled by the delay circuit from the closure of the switch S5, the transistor Tr5 is rendered conductive to energize the latching relays RL2b and RL3b, thereby the second and third transfer switches L2 and L3 are set from their a positions to their b positions, so that the motor M is disconnected from the power supply source E provided that the first transfer switch L1 remains set in its NC position, or provided that the both release switches S1 and S3 are not closed. Thereafter, as the motor is permitted to rotate under the action of the inertia thereof, an electromotive force is produced across the motor M between the terminals of the motor M, causing a base current of the transistor Tr6 to flow through the resistor R13, so that the transistors Tr6 and Tr7 are rendered conductive to short-circuit the motor M, thereby the motor M is braked to stop. The setting of the transfer switches L2 and L3 to the a position and b positions respectively also short-circuits the motor M, thereby it is braked to stop regardless of whether the transistor Tr6 and Tr7 are conducting or not.

The operation of the apparatus shown in FIGS. 1 through 5 is as follows. At first, before exposure of the photographic film in a patrone associated in the camera, it is required for the operator to set the dial 25. If the apparatus is in an operation condition just after the rewinding operation is completed, the dial 25 is in its rest position where the numerical character "36" is registered with the index CI as will be described in detail later. Therefore, when the used patrone is replaced with a new film patrone for 36 exposures frames, there is no need to reset the dial 25. But when a film patrone for other than 36 exposure frames, for example, 20 exposure frames is used, the operator must push the knob 48 against the force of the spring 49, so that the fluted projections 48a of the sleeve affixed to the knob 48 are brought into engagement with the fluted recesses 25e of the ratchet wheel 25, and then to turn the knob 48 to place the graduation "20" in registry with the index CI. Next, the exposure operation mode selector 53 is turned from "OFF" position to place either symbol C or symbol S in registry with the index SI, thereupon the main switch SM of the camera is turned on to render operative the automatic exposure control circuit of the camera, and simultaneously the main switch S2 of the apparatus is turned on.

For a series of continuous successive exposure operations, the mode selector knob 53 is turned to place the symbol C in registry with the index SI. So long as the apparatus is set in the operation condition just after the rewinding operation is completed, the cam 10 assumes an operating position where the cam lobe 10a thereof is located within the range of travel from the position adjacent the roller 64 to the position adjacent the arm 24b of the V-shape lever 24 as shown at the dash lines or solid line in FIG. 5a. At this moment, the slide 15 is locked by the latch lever 23 in engagement of the recess 15d with the projection 23a, so that the release rod 20 is pushed down under the force of the spring 21. In this operating condition, all of the switches SM, S2, S5 and S8 are "on" and the switch S6 is "off". The switches S7 and S7' are set in the positions F and F' and the switches L1 and L2 are set in the b positions. With the apparatus ready to operate the shutter mechanism of a not shown camera, when either of the release switches S1 and S3 is turned on, the transistor Tr1 is rendered conductive to energize the relay RL1. Accordingly the transfer switch L1 is set from the NC position to NO position to permit a current to flow through a motor drive circuit. The latter can be traced from the positive terminal of the battery E through S2, S9, Diode D2, contact F of S7, motor M, contact F' of S7', contact b of L2 and contact "NO" of L1 to the negative terminal of the battery E. This causes the motor M to rotate in the forward direction indicated by Arrow M₁ in FIG. 1. It is to be noted that even when the release switch S1 or S3 is accidentially turned off before the shutter mechanism is operated, the energization of the relay RL1 is not terminated. Once the switch L1 is set from the NC position to the NO position to connect the emitter electrode of the transistor Tr2 through the resistor R4 to the negative terminal of the battery E a self-sustaining function is established in the connection of the transistor Tr1 and Tr2. Upon rotation of the motor M, the second sun gear 9 begins to rotate in the clockwise direction opposite to that indicated by arrow M₂ because the first sun gear 8 is prevented from rotating as a film advance mechanism of the camera is arrested. As the sun gear 9 is rotated, the pin 61 on the cam 10 strikes the arm 24b of the lever 24 and turns the lever 24 in the counter-clockwise direction. The pivoting movement of the lever 24 is transmitted through the pin 74 to the latch lever 23 causing the lever 23 to turn in the counter-clockwise direction of arrow $M_8$ against the force of the spring 22, thereby the slide 15 is released from the locked position and moves in the direction of arrow $M_3$ causing the first interconnecting lever 18 to turn in the counter-clockwise direction of arrow $M_5$ and the second interconnecting lever 19 to turn in the counter-clockwise direction of arrow $M_6$, so that the release rod 20 moves upward to actuate the shutter release button in the camera body. As the latch lever 23 is turned in the counter-clockwise direction of arrow $M_8$, the pivoting movement is transmitted through the bevelled edge 32a to the reciprocating 29, thereby the plate 29 is turned against the force of the spring 30 in the clockwise direction opposite to that of arrow $M_{10}$ through the maximum possible angular displacement, causing the ratchet 32 mounted thereon to advance the ratchet wheel 25 one tooth against the action of the spring 27 or its dial one exposure frame graduation.

Figures 5B, 5C:
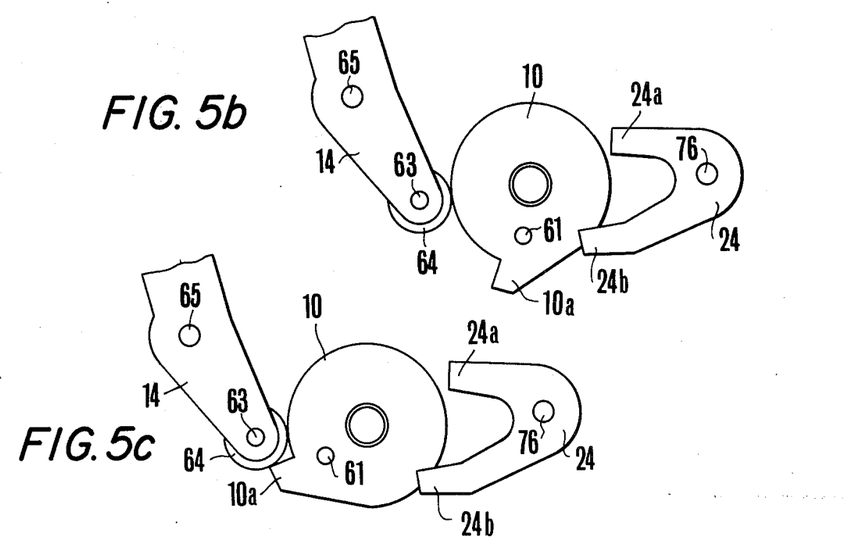
FIG. 5b is a fragmentary top view of the rotary actuator in an operating position after the shutter releasing operation is completed.
FIG. 5c is a fragmentary top view of the rotary actuator in an operating position where the motion of the motor is being transmitted to the film advance mechanism of the camera.

On the other hand, as the lever 23 is rotated in the direction of arrow $M_{10}$, the switch S5 is turned off and the switch S6 is momentarily turned on, thereupon the latching relay RL2a is energized to set the switch L2 from its *b* position to its *a* position. Further at this moment, the switch L3 is in the position *b*. As a result, the both terminals of the motor M are short-circuited, and the motor M is braked to stop. In this moment, the cam 10 assumes a position shown in FIG. 5b. Upon termination of the duration of an exposure interval, the shutter of the camera is closed. At the same time, responsive to the shutter termination signal, the switch S4 is turned on to energize the latching relay RL3a, thereupon the switch L3 is set from its *b* position to its *a* position to complete a motor drive circuit which can be tranced from the positive terminal of the battery E, through S2, S9, D2, F contact of S7, motor M, F' contact of S7', contact *a* of L2, contact *a* of L3, S8 and S10 to the negative terminal of the battery E, so that the motor M begins to rotate in the forward direction. The motion of the motor M is transmitted to the rotary drive gear assembly 5 through the gear trains 2, 3, 4 and 6. In this moment, while the first sun gear 8 is prevented from rotating under a certain load necessary to operate the film winding mechanism of the camera, the second sun gear 9 which is free from any load is rotated to a position where the cam lobe 10a abuts the roller 64 as shown in FIG. 5c, as the planet gears 7 revolve around the sun gears 8 and 9 in the counter-clockwise direction of arrow $M_2$. When the cam 10 is prevented from rotating by abutment with the roller 64, the first sun gear 8 is caused to rotate in the direction of arrow B overcoming the aforesaid load, thereby the film advance mechanism is operated through the adapter piece 11 to advance the film one exposure frame, and simultaneously the shutter cocking mechanism is operated to set the shutter mechanism to its charged position. When the operation of the film advance mechanism is terminated, the film advance mechanism is arrested by a detent means provided therein, thereby the first sun gear 8 in turn is stopped from rotating, and instead the second sun gear 9 is again driven into rotation in the opposite direction to that indicated by arrow $M_2$, thereby the lever 14 is turned in the clockwise direction to move the slide 15 in the direction of arrow $M_3$ to its locked position where the projection 23a of the latch lever 23 is received in the recess 25d. The movement of the slide 15 results in the downward movement of the release rod 20 under the action of the spring 21. In this moment, the apparatus is set to an operating position ready for the next operation of the shutter mechanism. When the detent projection 23a enters the recess 25d, the switch S5 is closed so that at a time after a time interval controlled by the delay circuit from the closure of the switch S5, a pulse is applied from the cathode of the oscillator element PUT to the base of the transistor Tr5 to render it conductive, thereby the latching relay RL2b and RL3b are energized to set the switches L2 and L3 from their *a* positions to their *b* positions. In this moment, if either of the release switches S1 and S3 is in the closed position, the switch L1 is in the NO position, so that a current is allowed to flow through a motor drive circuit which can be traced from the positive terminal of the battery E through S2, S9 D2, contact F of S7, motor M, contact F' of S7', contact *b* of L2, contact NO of L1 and S10 to the negative terminal of the battery E thereupon the motor M is driven into rotation in the forward direction to perform the next cycle of the operations. The sequence repeats itself provided that the switch S8 as well as either of the release switches S1 and S3 are closed. If the release switches S1 and S3 are opened, the switch L1 is set from the NO position to the NC position. Therefore, when the operation of the film advance mechanism is terminated, the switch S5 is closed to set the switches L2 and L3 from their *a* positions to their *b* positions, thereupon the motor drive circuit is cut off. At this moment, as mentioned with reference to FIG. 6, the transistor Tr7 is rendered conductive through the transistor Tr6 to short-circuit the both terminals of the motor M, thereby the motor M is braked to stop. When the motor M is stopped, the cam 10 assumes the operating position illustrated in FIG. 5a. Therefore, if the release switch S1, S3 is again closed, the actuating means for the shutter mechanism is immediately operated. Even though the release switch S1, S3 is closed lastingly, the apparatus is rendered in operative when the numerical character "O" on the dial 25 is registered with the index CI, because the switch S10 is turned off to automatically cut off the motor drive circuit.

For a single frame exposure operation, the operator turns the selector 53 to plate the symbol S in registry with the index SI, thereupon the switches SM and S2 are closed and the switch S8 is opened as shown in Table 1. With the apparatus ready to operate the charged shutter mechanism of a not shown camera, when either of the release switches S1 or S3 is closed, the shutter mechanism and the counter mechanism are operated in a manner similar to that in the continuous successive exposure operations, wherein when the switch S6 is turned on to energize the latching relay RL2a, the switch SL2 is set from its *b* position to its *a* position, while the switch L3 remains set in the *b* position, thereupon the motor drive circuit is cut off and simultaneously the resistor R4 is disconnected from the power supply source E, so that the connection of the transistors Tr1 and Tr2 losts the self-sustaining action, thereby the cam 10 is permitted to assume an operating position indicated in FIG. 5b. In this moment, therefore, if the release switches S1 and S3 are opened, the switch L1 is set from the NO position to the NC position. Next, when the shutter in the camera is closed, the ratching relay RL3a is energized as mentioned above, thereby the switch L3 is set from the *b* position to the a position to complete the motor drive circuit which can be tranced from the positive terminal of the battery E through S2, S9, contact F of S7, motor M, contact F' of S7', contact a of L2, contact a of L3 and contact NC of L1 to the negative terminal of the battery E. Thereupon, the motor M is driven into rotation in the forward direction to operate the film winding mechanism of the camera. Upon termination of the operation of the film winding mechanism, the switch S5 is closed, and at a time after a time interval dependent upon the voltage of the battery E from the closure of the switch S5, the latching relays RL2b and RL3b are energized to set the switches L2 and L3 from their a positions to their b positions, thereby the motor drive circuit is cut off because at this moment the switch L1 remains set in the NC position, so that the transistors Tr6 and Tr7 are rendered conductive to short-circuit the both terminals of the motor M, and the motor M is braked to stop. When the motor M is stopped, the cam 10 assumes an operating position indicated in FIG. 5a. If the release switch S1 or S3 is closed again, the next cycle of the operations is initiated to make a single frame exposure.

Consideration will now be given to the control of the cam 10 so as to accurately assume the most appropriate operating position prior to the actuation of the shutter release button for the shutter mechanism of the camera. As the first sun gear 8 is rotated in the counter-clockwise direction to operate the film winding mechanism through the first drive adapter assembly comprising the shaft 62 and the adapter piece 11, the force of restitution exerting upon the first sun gear 8 is increased which is stored in the film winding mechanism of the camera. Upon termination of the operation of the winding mechanism, the second sun gear 9 begins to rotate in the clockwise direction, while moving the roller 64 away from the cam lobe 10a. When the second sun gear 9 is freed from the roller 64, it is rotated in the clockwise direction together with the first sun gear 8 on which the force of restitution stored in the winding mechanism is exerted through an angle, e.g., 120°, equal to that required for the first sun gear 8 to perform the complete operation of the winding mechanism. Therefore, during the time interval between the initiation of the moving away of the roller 64 and the termination of the motion of the motor M, the cam 10 is turned from the arrested position shown in FIG. 5c to an operating position ready for actuation of the shutter mechanism as indicated in FIG. 5a through an angular distance defined by the following formula:

| The total angular distance | = | an angular distance through which the cam is moved by the force of restitution<br>+<br>an angular distance through which the cam is moved by the power of the motor M during the time interval between the closure of switch S5 and the stop of the motor M. |

In order to stop the cam 10 accurately at a predetermined operating position ready for actuation of the shutter mechanism, it is necessary to maintain constant the value of the above mentioned formula. It is evident that the former term is maintained constant. On the other hand, the power of the motor M is varied with variation of the voltage of the power supply source. According to the present invention, the time interval between the closure of switch S5 and the initiation of the braking of the motor M is controlled by the delay circuit comprising the resistors R9 and R10, variable resistor RV, condenser C5, oscillator element PUT and constant voltage diode ZD2, so that the latter term can be maintained constant regardless of variation of the voltage of the power supply source. In other words, assuming that the power supply source E has a voltage $V_I$, when the braking of the motor M is initiated at a time when the cam assumes a position indicated by a Roman character I, the cam is moved through an angle of $\theta_I$ until it stops at the position indicated by the solid line or a Roman character III. In the case of a power supply source voltage $V_{II}$ ($<V_I$), when the braking of the motor M is initiated at a time when the cam 10 assumes a position indicated by Roman character II the cam is moved through an angle of $\theta_{II}$ until it stops at the same position indicated by Roman character III as in the case of voltage $V_I$, provided that the parameters of the elements of the delay circuit are selected to establish a predetermined relationship between the angular diferrence ($\theta_I - \theta_{II}$) and the voltage difference ($V_I - V_{II}$). Consequently, when the motor M is stopped, the cam 10 assumes the predetermined operating position with high accuracy regardless of variation of the voltage of the power supply source.

The operation of the film rewinding mechanism is as follows. When all of the frames available in the associated film have been exposed, the operator may push the pin 86 against the elastic force of the lock plate 52 itself to release the Y-shape lever 44 and then turn the knob 81 in the direction of arrow $M_{15}$. As the knob 81 is turned in the clockwise direction of arrow $M_{15}$ against the force of the spring 42, the arm 44a of Y-shape lever 44 moves upward the rewinding shaft 41 through the arm end 44c and the flange 43, and the other arm 44b turns the lever 45 through the roller 89 in the clockwise direction against the force of the spring 47. As the lever 45 is turned in the clockwise direction, the lever 34 is turned in the counter-clockwise direction against the force of the spring 36, thereupon the ratchet 32 and the pawl 34a of the lever 34 are simultaneously disengaged from the ratchet wheel 25 permitting the ratchet wheel 25 to rotate in the counter-clockwise direction of arrow $M_0$ until the projection 25b abuts the pin 28, or until the graduation indicated by numerical character "36" is registered with the index CI. As the knob 81 is further rotated in the clockwise direction, the lever end 34c moves upwards the roller and shaft 92 and 91 connected to the pin 54 to actuate the sprocket release button not shown. When the sprocket mechanism is completely released, the roller 89 rides over the camming surface 44e of the lever 44, so that the knob 81 can be further turned in the clockwise direction, thereby the switches S7 and S7' are operated by the pins 82 and 83 rigidly fixed on the arms 44c and 44d respectively being set from their "F" and "F' " positions in their "R" and "R' " positions to complete a reverse motor drive circuit which can be tranced from the positive terminal of the battery E through S2, S9, contact R' of S7', motor M, and contact R of S7 to the negative terminal of the battery E. As the motor M is rotated in a reverse direction, the motion of the motor M can not be transmitted by the one-directional clutch and spring 58 to the rotary actuator. When the knob 81 is further turned in the clockwise direction, the projections 50b of the adapted piece 50 are brought into engagement with film patrone not shown and the clutch slot 80a of the flanged cup 80 is brought into engagement with the pin 78 affixed to the sleeve 40a of the worm wheel 40, thereupon the motion of the motor M is transmitted to the patrone through the gear train 2a, 37, 38, 29 and 40, pin 78, flanged cup 80, rewinding shaft 41 and adapted piece 11. When the rewinding operation is completed, the operator may release the knob 81, thereupon the rewinding shaft 41 is moved downward under the force of the spring 42 to disengage the adapter piece 50 from the film patrone, and the lever 44 is automatically returned to the initial position illustrated in FIG. 2. Thereupon the switches S7 and S7' are set from the "R" and "R'" positions to the "F'" positions, and the lever 45 is turned in the direction of arrow M by the action of the spring 47, permitting the lever 34 to turn in the direction of arrow $M_{12}$, thereby the pawl 32a of the ratched 32 and the pawl 34a of the lever 34 are brought into engagement with the ratchet wheel 25.

Figure 7:
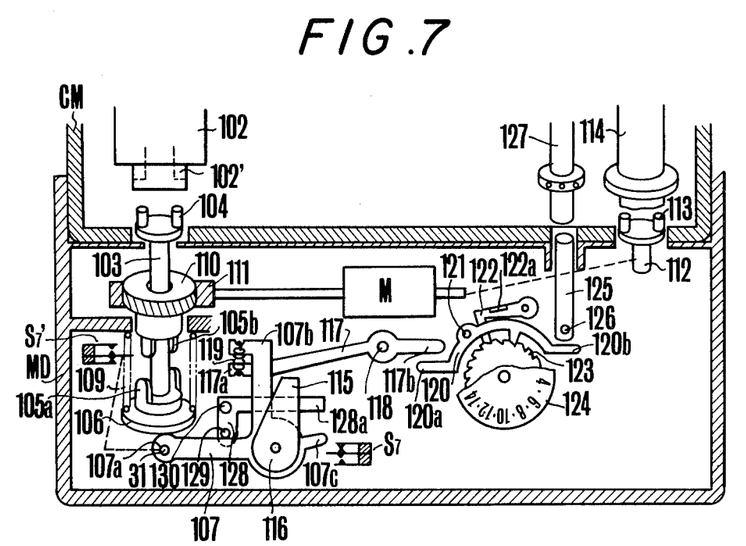
FIG. 7 is a fragmentary partly sectional perspective view of the rewinding mechanism of the apparatus of the invention attached to a camera.
Figure 8:
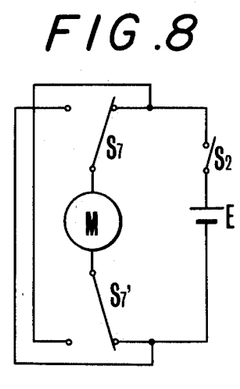
FIG. 8 is a diagram of a reversible motor drive circuit incorporated in the circuit of FIG. 6.

Such a rewinding mechanism will be more clearly explained with reference to FIG. 7. The apparatus housing MD is attached to the camera housing CM which accommodates a film patrone 102 having a spool shaft 102 with which an adapter piece 104 affixed to the upper end of a rewinding shaft 103 in the apparatus is engageable. Fixedly mounted on the lower end of the shaft 103 is a disk 106 for engagement with a pawl clutch 105a and the end 107a of one arm of a multi-purpose lever 107. An expansion spring 109 is compressed between the apparatus housing MD and the disk 106, tending to urge the rewinding shaft 103 toward the downward direction. The shaft 103 passes through the center portion of a worm wheel 110 movably mounted on the apparatus housing MD. The worm wheel 110 is provided with a pawl clutch 105b affixed to the lower surface thereof and is connected through a worm 11 and a not shown gear trains to one end of the drive shaft of a motor M. The opposite drive shaft end of the motor M is connected to a winding-up shaft 112 having an adapter piece 113 through a suitable intermediary known in the art. As the motor M is rotated in the forward direction, the film strip is wound up around a take up spool 114. A rewinding operation operable knob 115 is affixed to the shaft of the lever 107 and is rotatable in reference with the apparatus housing. One end portion 117a of an interconnecting lever 117 which is fulcrumed at a pivot shaft 118 affixed to the apparatus housing MD is connected to one end portion 107b of the lever 107 through a spring 119, and the other end portion 117b is engaged with one end portion 120a of a semi-circular lever 120 which is fulcrumed at a shaft 121 affixed to the housing MD. A ratched 122 is arranged to cooperate with a ratchet wheel 123 and a pawl provided in the semi-circular lever 120 and is provided with a projection 122a extending into the range of movement of the lever 120, so that when the lever 120 is turned in the counter-clockwise direction, the ratchet 122 is disengaged from the ratchet wheel 123. A counter dial 124 is affixed to the ratchet wheel 123 so that as the ratchet wheel 123 is rotated, it indicates a number of exposed frames or the number of unexposed frames. 125 is an operating rod for releasing sprocket means 127 of the camera having a pin 126 vertically affixed thereto and arranged in the range of movement of the lever end 120b. Switches S7 and S7' for controlling the direction of rotation of the motor M are arranged to be operated by one end 107c of the multi-purpose lever 107 and a pin 131 on the end portion 107 of the multi-purpose lever 107 respectively. 128 is an elastic lock plate for locking the knob 115 having one end portion 128a affixed to the housing MD and the other end portion provided with a pin 129 for engagement with the lever 107. 130 is a lock release button.

The operation of the rewinding mechanism described above is as follows. After all of the available exposure frames have been exposed, the operator may push the lock release button 130 to disengage the pin 129 from the multi-purpose lever 107, thereby the knob 115 is made free for rotation. Next, when the knob 115 is turned in the clockwise direction as viewed in FIG. 7 against the force of the spring 109, the multi-purpose lever 107 also is turned in the clockwise direction and the interconnecting lever 117 is turned in the clockwise direction so that one lever end 117b is brought into engagement with one end of the semi-circular lever 120, thereby the semi-circular lever 120 is turned in the counter-clockwise direction in the ratchet 122 and the pawl of the lever 120 are disengaged from the ratchet wheel 123 to reset the counter mechanims under the force of a not shown spring. A further pivoting movement of the knob 115 causes the lever end 120b to move upward the pin 126, thereby the sprocket means is released from its active state. At this moment, switches S7 is operated by the lever end 107c, but switch S7' is not operated and the pawl clutches 105a and 105b are not coupled with each other. When the knob 115 is further turned in the clockwise direction, the sprocket release button 125 can not be moved upward any more, so that only the multi-purpose lever 107 is turned in the clockwise direction against the force of the spring 119 to move upward the shaft 104, thereby te pawl clutches 105a and 105b are coupled with each other and further the adapter piece 104 are brought into engagement with the spool 102' of the patrone 102. In this stage, the switch S7' is operated by the pin 131 to drive the motor in the reserve rotation and the rewinding operation proceeds. When the rewinding operation is completed, the operator may release the knob 115 to the initial position under the force of the spring 109, thereby the rewinding shaft 103 is pushed down under the force of the spring 109 and the lever 107 is locked by the pin 129.

Figure 9:
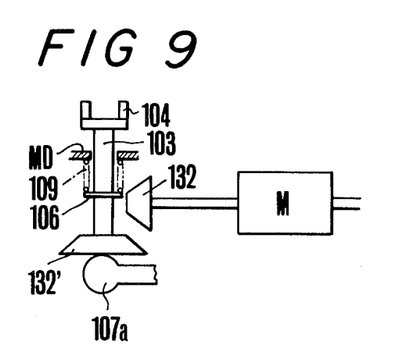
FIG. 9 is a schematic sectional view of a drive friction gear assembly usuable instead of the drive worm gear assembly of FIGS. 1, 2 and 8.

It will be seen from the foregoing description that the operation process (counter-reset-sprocket release-rewinding shaft lift-reversal of rotation of motor) of the rewinding mechanism can be controlled by a single operating member in timed relation and with high reliability. Further the spring 119 serves as a shock-absorbing means so that the sprocket means of the camera is not subject to an unnecessarily large load. Also the provision of the lock means prevents an accidental unintentional operation of the rewinding mechanism. Instead of using the worm 11 and worm wheel 110, a friction gear assembly 131 and 132 as illustrated in FIG. 9 may be used which serves as the clutch means and speed reduction means.

Figure 10:
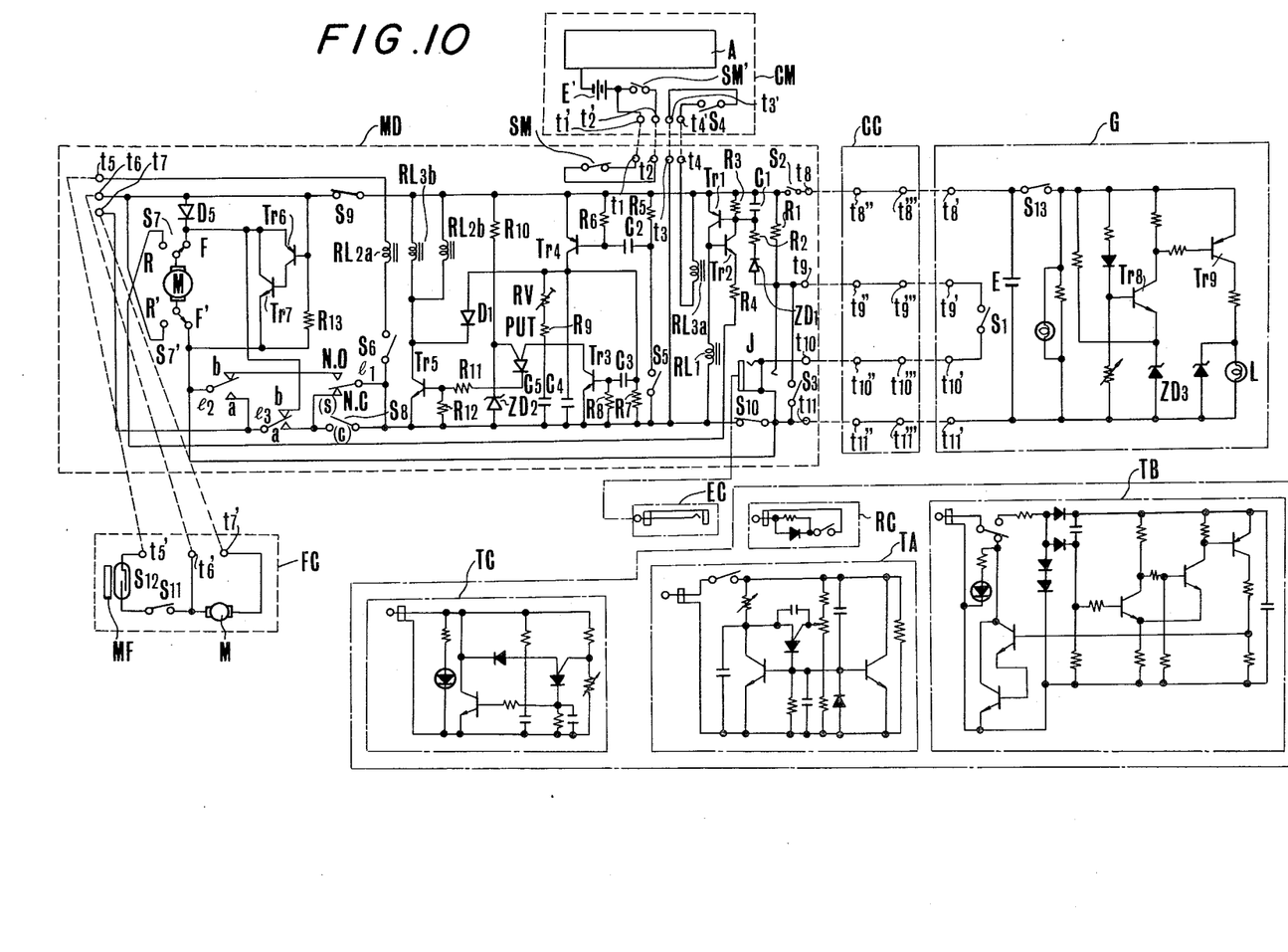
FIG. 10 is a control circuit diagram of the apparatus of FIGS. 1 and 2 attached to a camera and equipped with several control units.

In FIG. 10, there is shown a network of circuits of the apparatus of the invention attached to a camera and equipped with several units. A indicates a camera control circuit including an exposure control circuit. E' is a power supply source for the circuit A. SM' is a main switch of the camera CM. S4 is a switch adapted to be operated in response to the operation of the shutter of camera CM. Terminals $t1, t2, t3$ and $t4$ of the apparatus are adapted to be coupled with terminals t1', t2', t3' and t4' of the camera CM respectively. Terminals t5, t6 and t7 are adapted to be coupled with terminals t5', t6' and t7' of a film chamber unit FC respectively. Terminals t8, t9, t10 and t11 are adapted to be coupled through a connecting cable unit CC respectively with terminals t8', t9', t10' and t11' of a release unit G having a power source voltage checking function.

When the film chamber unit is attached to the apparatus of the invention, the switch S9 in the apparatus is turned off so that the operation control of the film winding mechanism is made by the motor M in the apparatus and the taking up operation of the film is carried out by the motor M' in the film chamber unit FC. S11 is a switch for detecting whether the film is present or not. S12 is a switch which is closed by an electromagnet MF in response to the opening of the cover of the film magazine.

In order to check the voltage of the power supply source E by means of the release unit G, it is necessary to turn off the main switch S2 in the apparatus MD and turn on the switch S13 in the release unit G. When the detected lever of the voltage of the power supply source E is higher than a reference level controlled by the constant voltage diode ZD3, the transistors Tr8 and Tr9 are rendered conductive so that a lamp L is lighted. When the detected level is lower than the reference level, the lamp is not lighted. RC is a remote control switch unit, TA is a timer unit, and TB is a self-timer unit. The output signals from these units are applied through an extension unit EC to the jack J as external signals for the apparatus MD.

As described above, in the electric driving device according to the present invention, the cam 10 as a rotating means stops only when the motor M is electrically controlled so that a stopping member for stopping the rotating member at its release position as required in the conventional devices is not required in the present invention. Also in the present invention, the delay circuit which varies the starting time of control according to the voltage condition of the power source E is provided so as to control the starting time of the motor driving control so that it is possible to maintain the stop position of the cam 10 at the release position irrespective to the voltage condition of the power source E.

In the foregoing examples, descriptions have been made limitedly to the case where an electric driving device as an attachment is mounted to the camera body. The present invention should not be limited to the examples, and the present invention can be applied to a camera into which the electric driving device is assembled, and various modifications can be made without deviating from the scope of the present invention.

What is claimed is:

1. A motor-driven operating apparatus for a camera comprising:
    rewinding member engageable with a film rewinding spool in a camera body, said rewinding member being movable between a first position at which it engages the spool and a second position at which it does not engage the spool,
    a winding member engageable with a film winding spool in the camera body,
    driving means coupled to the rewinding member and the winding member and rotatable in a forward direction for winding the film and rotatable in a reverse direction for rewinding the film,
    drive control means coupled to the driving means for controlling the driving means, said control means having a changeover switch which switches the driving means from rotation in one direcaton to the other direction in response to movement of the rewinding member,
    a sprocket engageable to film in the camera body, release means for releasing sprocket,
    a counter for counting the number of photographed film frames,
    resetting means for rotating the counter to its initial position,
    operating means for actuating the resetting means, the release means and the rewinding member so that the operation means first actuates the resetting means and release means and moves the rewinding member to the first position to switch the changeover switch and to rotate the driving means in the reverse direction, and
    lock means coupled to the operating means for locking the operating means during winding and releasing the operating means during rewinding.

2. A motor-driven operating apparatus for a camera comprising:
    a rewinding member engageable with a film rewinding spool in a camera body, said rewinding member being movable between a first position at which it engages the spool and a second position at which it does not engage the spool,
    a winding member engageable with a film winding spool in the camera body,
    driving means coupled to the rewinding member and the winding member and rotatable in a forward direction for winding the film and rotatable in a reverse direction from rewinding the film,
    drive control means coupled to the driving means for controlling the driving means, said control means having a changeover switch which switches the driving means from rotation in one direction to the other direction in response to movement of the rewinding member,
    a sprocket engageable to film in the camera body, release means for releasing sprocket,
    a counter for counting the number of photographed film frames,
    resetting means for restoring the counter to its initial position,
    operating means for actuating the resetting means, the release means and the rewinding member so that the operation means first actuates the resetting means and release means and moves the rewinding member to the first position to switch the changeover switch and to rotate the driving means in the reverse direction, and
    buffer means between the operating means and the release means for preventing said operating means from placing a load in excess of a given load on the release means from the operating means.

3. The apparatus according to claim 2 in which the drive control means includes a winding control circuit for causing rotation of the driving means in the forward direction and a rewinding control circuit for causing rotation of the driving means in the reverse direction.

4. The apparatus according to claim 3 which further comprises detection means coupled to the counter for detecting whether the counter has counted a predetermined number of film frames, said detecting means being coupled to disable the winding control circuit.

5. The apparatus according to claim 4 in which the detection means is a switch.

* * * * *